US012784137B2

(12) United States Patent
Nagano et al.

(10) Patent No.: US 12,784,137 B2
(45) Date of Patent: Nov. 3, 2026

(54) SAMPLING TECHNIQUE TO SCALE NEURAL VOLUME RENDERING TO HIGH RESOLUTION

(71) Applicant: NVIDIA Corporation, Santa Clara, CA (US)

(72) Inventors: Koki Nagano, Playa Vista, CA (US); Alexander Trevithick, Mamaroneck, NY (US); Matthew Aaron Wong Chan, Los Altos, CA (US); Towaki Takikawa, Toronto (CA); Umar Iqbal, San Jose, CA (US); Shalini De Mello, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 217 days.

(21) Appl. No.: 18/830,914

(22) Filed: Sep. 11, 2024

(65) Prior Publication Data

US 2025/0111474 A1 Apr. 3, 2025

Related U.S. Application Data

(60) Provisional application No. 63/587,349, filed on Oct. 2, 2023.

(51) Int. Cl.
*G06T 3/4046* (2024.01)
*G06T 5/60* (2024.01)
(Continued)

(52) U.S. Cl.
CPC .............. *G06T 3/4046* (2013.01); *G06T 5/60* (2024.01); *G06T 5/70* (2024.01); *G06T 15/08* (2013.01)

(58) Field of Classification Search
USPC ................................ 382/299, 155–156, 159
See application file for complete search history.

(56) References Cited

U.S. PATENT DOCUMENTS 11,335,056 B1 * 5/2022 Takikawa .............. G06T 15/005
11,455,790 B2 * 9/2022 Karras ................... G06V 10/82
(Continued)

OTHER PUBLICATIONS

Or-EL et al., StyleSDF: High-Resolution 3D-Consisten Image and Geometry Generation, IEEE, 978-1-6654-6946, 2022 IEEE/CVF Conference on Computer Vision and Pattern Recognition (CVPR), pp. 13493-13503,. (Year: 2022).*
(Continued)

*Primary Examiner* — Ishrat I Sherali
(74) *Attorney, Agent, or Firm* — Leydig, Voit & Mayer, Ltd.

(57) ABSTRACT

Systems and methods are disclosed that relate to synthesizing high-resolution 3D geometry and strictly view-consistent images that maintain image quality without relying on post-processing super resolution. For instance, embodiments of the present disclosure describe techniques, systems, and/or methods to scale neural volume rendering to the much higher resolution of native 2D images, thereby resolving fine-grained 3D geometry with unprecedented detail. Embodiments of the present disclosure employ learning-based samplers for accelerating neural rendering for 3D GAN training using up to five times fewer depth samples, which enables embodiments of the present disclosure to explicitly "render every pixel" of the full-resolution image during training and inference without post-processing super-resolution in 2D. Together with learning high-quality surface geometry, embodiments of the present disclosure synthesize high-resolution 3D geometry and strictly view—consistent images while maintaining image quality on par with baselines relying on post-processing super resolution.

20 Claims, 10 Drawing Sheets

(51) Int. Cl.
*G06T 5/70* (2024.01)
*G06T 15/08* (2011.01)

(56) References Cited

U.S. PATENT DOCUMENTS

| | | | | |
|---|---|---|---|---|
| 11,580,395 | B2 * | 2/2023 | Karras | G06N 3/045 |
| 11,875,449 | B2 * | 1/2024 | Takikawa | G06T 15/005 |
| 11,983,815 | B2 * | 5/2024 | Shen | G06T 17/20 |
| 12,380,630 | B2 * | 8/2025 | Xu | G06T 17/00 |
| 12,456,250 | B1 * | 10/2025 | Wang | G06T 15/04 |
| 12,536,733 | B2 * | 1/2026 | Nagano | G06T 15/08 |
| 2024/0104842 | A1 * | 3/2024 | Nagano | G06T 7/70 |
| 2024/0265621 | A1 * | 8/2024 | Xu | G06T 3/4046 |
| 2025/0285377 | A1 * | 9/2025 | Khorramshahi | G06T 17/00 |
| 2025/0356175 | A1 * | 11/2025 | Schwarz | G06N 3/082 |
| 2026/0120238 | A1 * | 4/2026 | Chen | G06T 3/4053 |

OTHER PUBLICATIONS

Schirmer et al., Nural Network for Implicit Representations of 3D Scenes, IEEE 978-1-6654-2354-0/21, 2021 34th SIBGRAPI Conference on Graphics, Pattern and Images (SIBGRAPI), pp. 17-24.. (Year: 2021).*

Trevithick et al., What You See is What You GAN: Rendering Every Pixel for High-Fidelity in 3D GANs, IEEE 2575-7075/24,2024 IEEE/CVF Conference on Computer Vision and Pattern Recognition (CVPR), pp. 22765-22775, . (Year: 2024).*

* cited by examiner

SAMPLING TECHNIQUE TO SCALE NEURAL VOLUME RENDERING TO HIGH RESOLUTION

CLAIM OF PRIORITY

This application claims the benefit of U.S. Provisional Application No. 63/587,349 titled "Sampling Technique to Scale Neural Volume Rendering to High Resolution," filed Oct. 2, 2023, the entire contents of which is incorporated herein by reference.

FEDERAL FUNDING

This invention was made with government support under Defense Advanced Research Projects Agency (DARPA) Semantic Forensics (SemaFor) Contract No. HR0011-20-3-0005. The federal government may have certain rights in this invention.

BACKGROUND

Training three-dimensional (3D) generative models from the abundance of two-dimensional (2D) images allows the creation of 3D representations of real-world objects for content creation and novel view synthesis. Recently, 3D-aware generative adversarial networks (3D GANs) have emerged as a powerful method to learn 3D representations from collections of 2D images in an unsupervised fashion. These methods employ differentiable rendering to compare rendered 3D scenes with 2D data using adversarial training. Among the various 3D representations, Neural Radiance Fields (NeRF) have become a popular choice among recent successful 3D GANs. However, the significant computational and memory cost of volume rendering has prevented 3D GANs from scaling to high-resolution output. For instance, generating a single 512×512 image via volume rendering requires evaluating as many as twenty-five million depth samples, assuming ninety-six depth samples are used per ray using importance sampling. Given that GAN training typically requires rendering tens of millions of images, the training process may require evaluating hundreds of trillions of depth samples. As such, there is a need for addressing these issues and/or other issues associated with the prior art.

SUMMARY

Embodiments of the present disclosure relate to synthesizing high-resolution 3D geometry and strictly view-consistent images that maintain image quality without relying on post-processing super resolution. For instance, training 3D generative models from 2D images allows for the creation of 3D representations of real-world objects for content creation and novel view synthesis. A GAN generates a 3D triplane representation of a character (or 3D scene). The 3D triplane may be used to construct (via volume rendering) a 3D geometric model of the character. The 3D geometric model can then be used to render images of the character and a high-quality 3D geometric model is needed to render multi-view-consistent images of the character. High-quality volume rendering is slow (requires large numbers of samples) and the slowness contributes to slow training of the GAN. Embodiments of the present disclosure may speed up volume rendering using a sampling technique to generate higher-quality surface geometry faster, and thus may speed up GAN training that relies on volume rendering. For example, embodiments of the present disclosure may perform "smarter" (e.g., more efficient) sampling during volume rendering by concentrating the samples for each ray near the surface based on a low-resolution or coarse sampling to discover surface locations (e.g., surface variance Beta).

Specifically, among various 3D representations, NeRF has become a popular choice among recent successful 3D GANs. However, NeRF requires significant computational and memory cost for scaling to high-resolution output. For example, generating a single 512×512 image via volume rendering requires evaluating millions of depth samples, and because GAN training typically requires rendering tens of millions of images, the training process may require evaluating hundreds of trillions of depth samples, which is impractical to perform. As such, conventional approaches (e.g., Efficient Geometry-aware 3D (EG3D) GANs) employ low-resolution rendering such as rendering a 256×256 image with post-processing 2D super resolution, but this conventional approach sacrifices multi-view consistency and quality of resolved geometry. Thus, embodiments of the present disclosure describes an approach to "render every pixel" of the full, high resolution image during training and inference without post-processing super-resolution in 2D.

In other words, 3D GANs have shown remarkable progress in learning to generate multi-view consistent images and 3D geometries of scenes from collections of 2D images via neural volume rendering. Yet, the significant memory and computational costs of dense sampling in volume rendering have forced 3D GANs to adopt patch-based training or employ low-resolution rendering with post-processing 2D super resolution, which sacrifices multi-view consistency and the quality of resolved geometry. Consequently, 3D GANs have not yet been able to fully resolve the rich 3D geometry present in 2D images. As described herein, embodiments of the present disclosure describe techniques, systems, and/or methods to scale neural volume rendering to the much higher resolution of native 2D images, thereby resolving fine-grained 3D geometry with unprecedented detail. Embodiments of the present disclosure employ learning-based samplers for accelerating neural rendering for 3D GAN training using up to five times fewer depth samples, which enables embodiments of the present disclosure to explicitly "render every pixel" of the full-resolution image during training and inference without post-processing super-resolution in 2D. Together with learning high-quality surface geometry, embodiments of the present disclosure synthesize high-resolution 3D geometry and strictly view-consistent images while maintaining image quality on par with baselines relying on post-processing super resolution.

In an embodiment, the method includes obtaining a triplane representation that is generated using a generator and sampling the triplane representation using a volume renderer comprising a sign distance function (SDF) multilayer perception (MLP) to obtain a tensor of weights. The sampling of the triplane representation comprises inputting a plurality of viewing directions and a plurality of coordinate points into the SDF MLP to obtain a plurality of SDF values and generating the tensor of weights based on the plurality of SDF values. The method further includes upsampling the tensor of weights using an upsampler neural network to obtain a tensor of predicted weights and generating a high-resolution image based on the tensor of predicted weights.

BRIEF DESCRIPTION OF THE DRAWINGS

The present systems and methods for sampling technique to scale neural volume rendering to high resolution are described in detail below with reference to the attached drawing figures, wherein.

DETAILED DESCRIPTION

Figure 1:
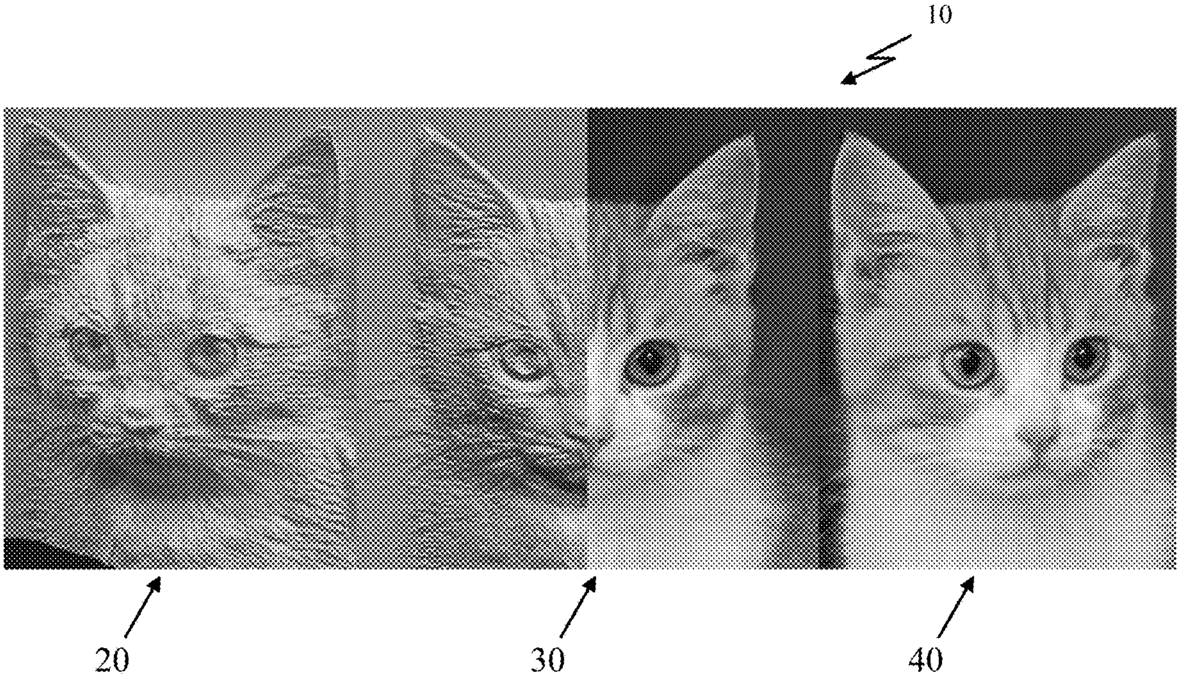
FIG. 1 shows a geometry, a normal, and volume renderings generated using one or more embodiments of the present disclosure.

As mentioned previously, using conventional approaches, generating a high resolution image (e.g., a 512×512 image) may require evaluating as many as twenty-five million depth samples, and thus, the GAN training process may require evaluating hundreds of trillions of depth samples. Further, during training, all intermediate operations may be stored in graphics processing unit (GPU) memory for every depth sample for the backward pass. Therefore, conventional approaches may resort to working on patches or adopting a low resolution neural rendering combined with post-processing 2D super-resolution (SR). However, patch-based conventional approaches may have limited receptive fields over scenes, leading to unsatisfactory results, and the hybrid low-resolution rendering and SR scheme inevitably sacrifices the multi-view consistency and the accuracy of 3D geometry. While many conventional approaches have been developed to improve the image quality of 3D GANs to match that of 2D GANs, the challenge of resolving the corresponding high-resolution 3D geometry remains unsolved.

Scaling 3D GANs to operate natively at the 2D pixel resolution requires a new approach for sampling. For instance, previously, EG3D employed ninety-six dense depth samples in total using two-pass importance sampling during training. This may require half a terabyte of GPU memory at 256×256 resolution, making scaling to higher resolutions infeasible. Furthermore, using ninety-six dense samples may still result in undersampling. Thus, in conventional approaches, 3D GANs may relying on post-processing SR layers that are capable of repairing these undersampling artifacts at the cost of a high-fidelity 3D representation.

As will be discussed below, the challenges of scaling neural volume rendering to high resolutions are addressed by explicitly rendering every pixel, ensuring that "what you see in 2D, is what you get in 3D" and generating an unprecedented level of geometric details as well as strictly multi-view-consistent images. For example, embodiments of the present disclosure may introduce a sign distance function (SDF)-based 3D GAN to represent high-frequency geometry with spatially-varying surface tightness that increases throughout training, which in turn facilitates low sample rendering. Additionally, and/or alternatively, embodiments of the present disclosure may use a generalizable learned sampler conditioned on low-resolution information to enable full-resolution rendering during training for the first time. Additionally, and/or alternatively, embodiments of the present disclosure may use a robust sampling strategy for the learned sampler that produces stable neural rendering using significantly fewer depth samples. In some instances, the sampler may operate with twenty samples per ray compared to existing 3D GANs, which utilize at least ninety-six samples per ray. Therefore, embodiments of the present disclosure may result in the state-of-the-art geometry for 3D GANs while rendering with quality on par with SR baselines.

FIG. 1 shows a geometry, a normal, and volume renderings generated using one or more embodiments of the present disclosure. For instance, FIG. 1 shows three sets of images 20-40. The first image 20 may be a geometry of a cat, the second image 30 may be a split between a normal and a volume rendering of the cat, and the third image 40 may be a volume rendering of the cat. As shown in the second image 30, the split view in the middle demonstrates the high degree of agreement between the 2D rendering and corresponding 3D geometry. Embodiments of the present disclosure may learn fine-grained 3D details (e.g., the cat's fur) that are geometrically well-aligned to 2D images without the multi-view of 3D scan data.

Figure 2A:
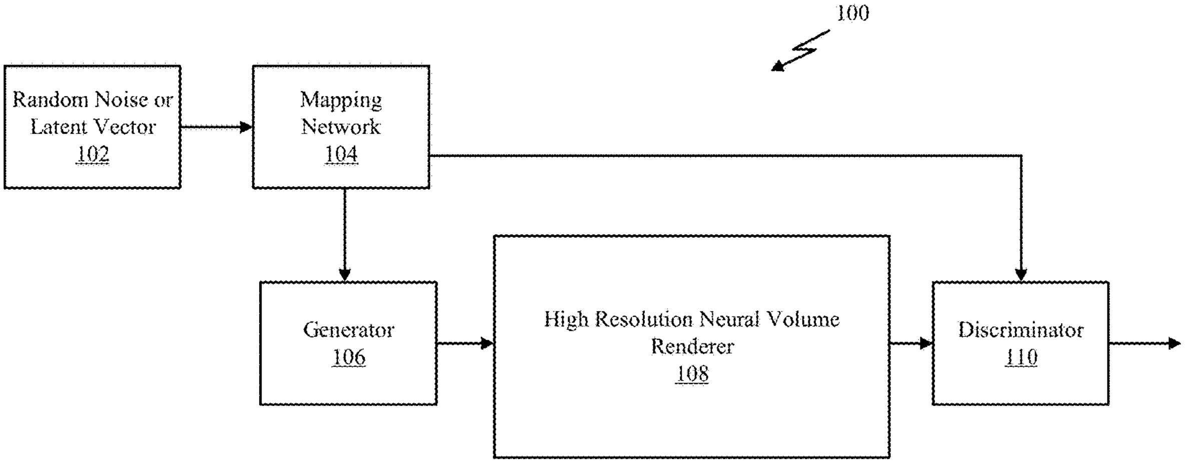
FIG. 2A illustrates a block diagram of a general overview of a system comprising a high resolution neural volume renderer that is suitable for use in implementing one or more embodiments of the present disclosure.

FIG. 2A illustrates a block diagram of a general overview 100 of a system comprising a high resolution neural volume renderer 108 that is suitable for use in implementing one or more embodiments of the present disclosure. The overview 100 shows random noise or latent vector 102, mapping network 104, generator 106, the high resolution neural volume renderer 108, and discriminator 110. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the overview 100 and/or the high resolution neural volume renderer 108 is within the scope and spirit of embodiments of the present disclosure.

For instance, the general overview 100 may perform a "rendering every pixel" approach by using the high resolution neural volume renderer 108. In some embodiments, the overview 100 may build on the EG3D GAN (see e.g., Chan et al. in "Efficient Geometry-aware 3D Generative Adversarial Networks," Computer Vision and Pattern Recognition (CVPR), 2022 ("Chan et al."), which is incorporated herein by reference) except that the aspects between the generator 106 and the discriminator 110 (e.g., the high resolution neural volume renderer 108) render every pixel and post-processing (e.g., a post-processing convolutional neural network (CNN) and/or a super-resolution module) is not required to achieve high resolution images.

As shown, the overview 100 includes random noise or a latent vector 102 that may be provided to the mapping network 104. The output from the mapping network 104 (e.g., intermediate latent code) is then provided to a generator 106 and a discriminator 110. The mapping network 104 may be a mapping neural network that is described in Chan et al. as well as U.S. Pat. No. 11,455,790, titled "Style-based architecture for generative neural networks" (the '790 patent) and U.S. Pat. No. 11,580,395, titled "Generative adversarial neural network assisted video reconstruction" (the '395 patent), both of which is incorporated herein by reference. For instance, based on inputting latent code (e.g., random noise or a latent vector 102) into the mapping network 104, the mapping network 104 generates intermediate latent code that is provided to the generator 106 and the discriminator 110.

The generator 106 and the discriminator 110 may be any type of generator or discriminator such as, but not limited to a GAN generator and a GAN discriminator. For instance, in some embodiments, the generator 106 may be a STYLEGAN or STYLEGAN2 Generator, which is described by Chan et al., the '790 patent, and the '395 patent. Based on inputting the intermediate latent code from the mapping network 104 into the generator 106, the generator 106 outputs a triplane representation and provides the triplane representation to the high resolution neural volume renderer 108.

In some examples, the generator 106 may be a modified STYLEGAN2 Generator. For instance, the STYLEGAN2 Generator, which is described in the '395 patent, may be modified by including an extra synthesis block (e.g., additional CNN block) for each orthogonal plane that generates more expressive triplane features T for each orthogonal plane, which allows disentanglement between the intermediate triplane features as plane-specific kernels may attend to the features in each separate plane. For example, a triplane representation may include three planes (e.g., XY plane, YZ plane, and ZX plane). The triplane representation may be a sparse representation of a 3D scene, which projects the 3D scenes into the axis-aligned planes. For instance, the XY plane may include top-down view feature maps of the scene, and the YZ and ZX planes may include front and side view feature maps of the scene. To generate the three planes of the triplane representation, a single CNN (e.g., STYLEGAN2) may be used. For the modified STYLEGAN2 generator, a first CNN (e.g., the original CNN from STYLEGAN2) may be connected to a second CNN block. The first CNN may output feature maps for each of the three planes, and the second CNN block may take the feature maps from the first CNN as input, and output a refined version of the feature maps. The refined version of the feature maps may be provided to the high resolution neural volume renderer 108.

In other words, in an embodiment, beginning from random noise or a latent vector 102 (e.g., a noise vector z), the initial triplane T' may be synthesized with STYLEGAN layers. In contrast to conventional approaches, in another embodiment, a modified STYLEGAN2 Generator that includes an extra synthesis block may be used. For example, more expressive triplane features T may be generated using the extra synthesis block for each orthogonal plane: $f_{ij}$=SynthesisBlock($f_{ij}'$) where ij∈{xy,xz,yz} and f' are the features of T'. Using the modified STYLEGAN2 Generator may allow disentanglement between the intermediate triplane features as plane-specific kernels may attend to the features in each separate plane.

In some embodiments, the generator 106 and the discriminator 110 may be a generator/discriminator that is not a GAN generator and/or GAN discriminator. For example, the generator 106 may be a generator that is associated with another model such as, but not limited to, a variational autoencoder (VAE), diffusion models, and/or other generative models. In other words, the high resolution neural volume renderer 108 may accept input from any type of generator 106, including, but not limited to, a GAN generator.

Prior to describing the high resolution neural volume renderer 108 in further detail, a few concepts that may be utilized by embodiments of the present disclosure are initially discussed. For instance, 3D GANs typically utilize a STYLEGAN-like architecture to map from a simple Gaussian prior to the conditioning of a NeRF, whether that be a multi-layer perceptron (MLP), 3D feature grid, manifolds, triplanes, and/or others. The triplane conditioning is discussed below given its high expressivity and efficiency, in which three axis-aligned 2D feature grids ($f_{xy}$, $f_{xz}$, $f_{yz}$), provide NeRF conditioning by orthogonal projection and interpolation. As in the conventional methods, the mapping and synthesis networks from STYLEGAN2 may easily be adapted to create the 2D triplane representation from noise $z\in\mathbb{R}^{512}$. Specifically, w=Mapping(z) conditions the creation of the triplane $T(w)\in\mathbb{R}^{3\times32\times512\times512}$ from a Synthesis network, corresponding to three axis aligned 2D feature grids of spatial resolution 512×512 and feature size 32.

Furthermore, instead of directly outputting the opacity a of a point $x\in\mathbb{R}^3$, an SDF value s may be output and transformed to σ using a Laplacian continuous probability distribution (CDF):

$$\sigma = \frac{1}{\beta}\begin{cases} \frac{1}{2}\exp\left(\frac{s}{\beta}\right) & \text{if } s \le 0 \\ 1 - \frac{1}{2}\exp\left(-\frac{s}{\beta}\right) & \text{if } s > 0 \end{cases} \quad (1)$$

where β is the variance of the Laplacian distribution governing the "tightness" of the representation. One distinct benefit of an SDF-based representation is the ease of extracting the surface.

Using the triplane conditioning and expression (1), each point in the volume with its opacity σ and radiance c may be assigned using a lightweight MLP. For a given camera ray r(t)=o+td, the volumetric rendering integral C(r) may be approximated by sampling ray distances $t_i$ with their corresponding $\sigma_i$ and $c_i$ before computing $$\hat{C}(r) = \sum_{i=1}^{N} w_i c_i \text{ where } w_i = T_i(1 - \exp(-\sigma_i\delta_i)), \quad (2)$$

$$T_i = \exp\left(-\sum_{J=1}^{i-1}\sigma_j\delta_j\right) \text{ and } \delta_i = t_{i+1} - t_i.$$

Here, $T_i$ denotes the accumulated transmittance, $w_i$ is a piecewise constant PDF that indicates how much the point contributes to the final color, and $\delta_i$ is the distance between adjacent samples along the ray.

It is possible to develop a more efficient estimator for this sum with fewer samples by using importance sampling techniques in computer graphics. Typically, one computes a piecewise constant probability distribution $$p_j = \frac{\hat{w}_j}{\sum_j \hat{w}_j},$$

where j refers to the $j^{th}$ bin or region, and $\hat{w}_j$ is an estimate of $w_j$ for that region, for example obtained by explicitly tracing coarse samples. For a given t, the region j(t) may be found and then $p(t)=p_j$ may be set. From this, a (piecewise linear) cumulative distribution function or CDF $\Phi(t)$ which has a range from 0 to 1 may be computed. Then, inverse CDF sampling may be performed to define the sample points, $$t_i = \Phi^{-1}(u_i), \tag{3}$$

where $u_i$ is a random number from 0 to 1 (sorted to be an increasing sequence).

As discussed below, embodiments of the present disclosure may improve on conventional techniques such as NeRF and EG3D by stratifying the random numbers $u_i$ during training; this leads to significantly lower rendering variance, especially at low sample counts N. Further, embodiments of the present disclosure may develop a neural method to predict a "good" distribution $p_j$ (and hence $\Phi$) for importance sampling at high spatial resolution, without needing to exhaustively step through the ray.

Figure 2B:
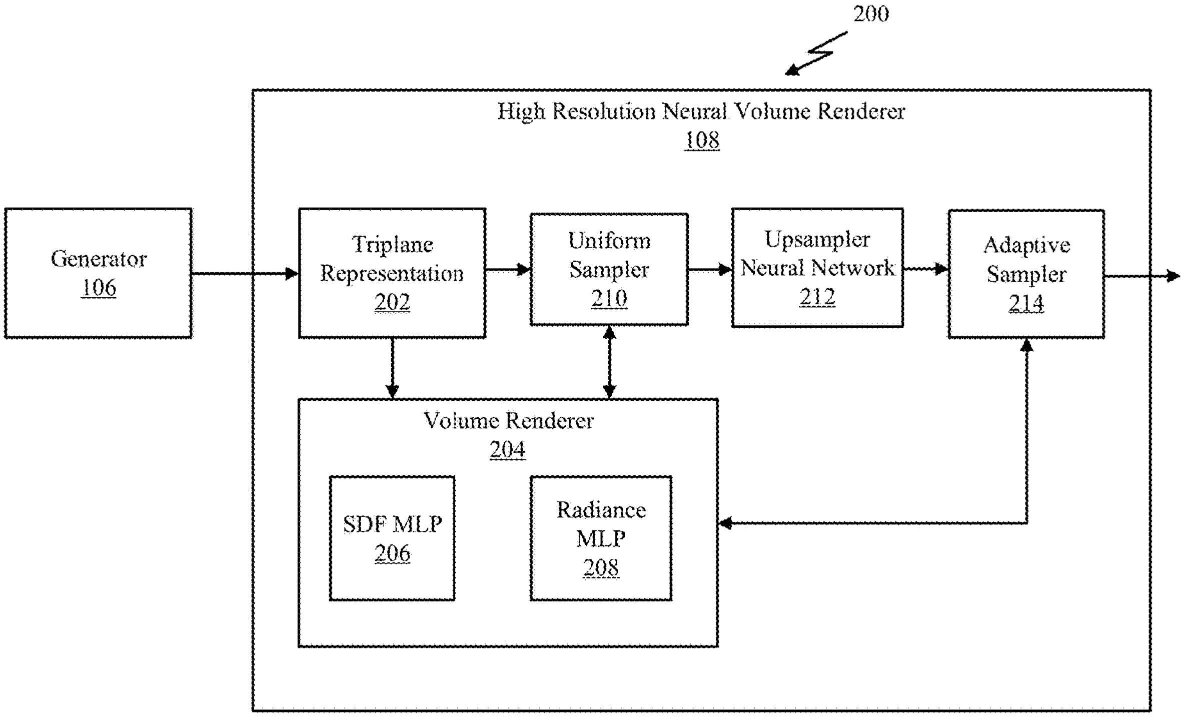
FIG. 2B illustrates a block diagram of performing high resolution neural volume rendering using the high resolution neural volume renderer, in accordance with one or more embodiments of the present disclosure.

FIG. 2B illustrates a block diagram 200 of performing high resolution neural volume rendering using the high resolution neural volume renderer 108, in accordance with one or more embodiments of the present disclosure. The block diagram 200 shows the generator 106 and the high resolution neural volume renderer 108 of FIG. 2A. The neural resolution neural volume renderer 108 shown in FIG. 2B includes a triplane representation 202, a volume renderer 204 that includes sign distance function (SDF) MLP 206 and radiance MLP 208, a uniform sampler 210, an upsampler neural network 212, and an adaptive sampler 214.

As will be discussed below, the high resolution neural volume renderer 108 may perform an SDF-based NeRF parametrization and render at high-resolution in three stages (e.g., a low-resolution probe into the 3D scene, a high-resolution CNN proposal network, and a robust sampling method for the resultant proposals). Furthermore regularizations for stable training and the training pipeline will also be described below.

Furthermore, as will be described with respect to FIG. 2B, the generator 106 may be a GAN generator (e.g., the modified STYLEGAN2 generator described above). However, as mentioned above, in other embodiments, the generator 106 may be any type of generator such as a generator associated with a VAE, diffusion models, and/or other types of generators.

As mentioned above, in an embodiment, the generator 106 may generate a triplane representation 202 and provide the triplane representation to the high resolution neural volume renderer 108. After obtaining the triplane representation 202 from the generator 106, the uniform sampler 210 samples the triplane representation using the volume renderer 204 to determine a low-resolution image ($I_{128}$) and a tensor of weights ($P_{128}$) that is then provided to the upsampler neural network 212. The volume renderer 204 may include an SDF MLP 206 and a radiance MLP 208. For example, based on the uniform sampler 210 providing a viewing direction (e.g., camera angle) and a coordinate point (x) of the triplane representation 202 to be sampled to the SDF MLP 206, the SDF MLP 206 outputs an SDF value s. The SDF MLP 206 is described using the following expression:

$$(s, \beta, f_{geo}) = MLP_{SDF}(PosEnc(x), T_x) \tag{4}$$

where s is the SDF value, $\beta$ is the variance, $f_{geo}$ is the geometry features, PosEnc(x) is the positional encoding from NeRF (e.g., a positional encoding that is based on the coordinate point of the triplane representation, and that is described in further detail by Mildenhall et al. in "Representing scenes as neural radiance fields for view synthesis," European Conference on Computer Vision (ECCV), 2020, which is incorporated herein by reference), $T_x$ are the features from the triplane representation 202 that correspond to the selected coordinate point x, and $MLP_{SDF}$ is an MLP (e.g., the SDF MLP 206) that maps or decodes the features from the triplane representation 202 into the SDF value, variance, and geometry features.

In other words, as described in Chan et al., EG3D improves upon NeRF by obtaining triplane features from all three planes of the triplane representation, aggregating the three triplane features together, and inputting them into a lightweight decoder to map the aggregated triplane features to a color and density value associated with the selected coordinate point and the camera angle. In contrast to EG3D, while the volume renderer 204 also obtains the triplane features from the three planes of the triplane representation 202 (e.g., $T_x$) and aggregates the triplane features (e.g., based on taking a Hadamard product of the three triplane vectors), instead of mapping these features into color and density directly, the volume renderer 204 includes the SDF MLP 206, and the SDF MLP 206 (e.g., the $MLP_{SDF}$ shown in the above expression) maps the triplane features into the SDF value, variance, and geometry features.

As such, instead of directly determining the density (e.g., opacity $\sigma$), the volume renderer 204 uses the SDF MLP 206 that first determines the SDF value, which may be transformed to the opacity using a Laplacian cumulative distribution function (CDF) and a variance $\beta$ of the Laplacian distribution that governs the "tightness" of the representation. For instance, using expression (1), which is reproduced below, the opacity at the selected coordinate point of the triplane representation 202 may be determined using the SDF value and variance:

$$\sigma = \frac{1}{\beta}\begin{cases} \frac{1}{2}\exp\left(\frac{s}{\beta}\right) & \text{if } s \le 0 \\ 1 - \frac{1}{2}\exp\left(-\frac{s}{\beta}\right) & \text{if } s > 0 \end{cases} \tag{1}$$

Further, to obtain the color or radiance at the selected coordinate point and viewing direction, a separate MLP may be used. For example, the volume renderer 204 may further include a radiance MLP 208 ($MLP_c$ in the expression below)

that takes the geometry features $f_{geo}$ from the SDF MLP 206 and selected viewing direction v, and outputs (e.g., predicts) the radiance c at the selected coordinate point. The radiance MLP 208 is described using the follow expression:

$$c = MLP_c(PosEnc(v), f_{geo}) \quad (5)$$

Based on the viewing directions and coordinate points from the uniform sampler 210, the SDF MLP 206 and the radiance MLP 208 may be used numerous times to sample the triplane representation 202 to generate a low resolution red, green blue (RGB) image and/or obtain a tensor of weights. The uniform sampler 210 may function similarly to the uniform sampler that is described in Mildenhall et al. (e.g., NeRF) and Chan et al. (e.g., EG3D) except that the uniform sampler 210 may use the volume renderer 206 comprising the SDF MLP 206 and the radiance MLP 208. For instance, based on a viewing direction and for each pixel, a camera ray that is projected onto the triplane representation 202 may be determined. For example, the uniform sampler 210 may generate a low resolution RGB image having a pixel resolution of 128×128, and may determine a camera ray for each pixel of the RGB image. Then, along the camera ray, the uniform sampler 210 may take samples associated with each pixel. For instance, for a pixel for the RGB image, the uniform sampler 210 may take a number of samples (e.g., a hundred and ninety-two coarse samples) along the camera ray for the pixel. Each of the samples may be separated uniformly across the ray and may be associated with a particular coordinate point within the triplane representation 202. Thus, for each sample, the uniform sampler 210 may provide the coordinate point for the ray x and the viewing direction v to the volume renderer 204, and the volume renderer 204 may use the SDF MLP 206 and the radiance MLP 208 to determine the radiance (e.g., RGB color values) and opacity (e.g., density) at the coordinate point. Therefore, for a 128×128 RGB image, the uniform sampler 210 may obtain a tensor of weights, which is described in further detail in Mildenhall et al. (e.g., Equation (5) from Mildenhall et al.). In some embodiments, the tenor of weights $P_{128}$ may have the dimensions 192×128×128 (e.g., for each pixel of the 128×128 image, the data structure would include 192 sample points indicating the radiance and opacity from the MLPs 206 and 208). Each 192-dimensional vector from the data structure may correspond to a piecewise constant probability density function (PDF). In other words, the tensor of weights (e.g., the 192-dimensional vectors) may encode information of where the 3D scene surface may lie along the path of the vector. As such, the uniform sampler 210 may be used to "understand" the rough location of the scene surface, which is encoded within the tensor of weights (or PDF), and the tensor of weights may be super-resolved to a high resolution PDF using the upsampler neural network 212. For example, the weight tensor may be super-resolved by the upsampler neural network 212 (and then the adaptive sampler 214 may use the super-resolved weights). The upsampler neural network 212 and the adaptive sampler 214 will be described in further detail below.

In other words, given a triplane T (e.g., the triplane representation 202) and a point $x \in \mathbb{R}^{3}$ 3, an MLP (e.g., the SDF MLP 206) may be utilized to map to the SDF value s, variance β and geometry features $f_{geo}$, which is described by expression (4) above. Initially, the rectified linear unit (ReLU) of the $MLP_{SDF}$ (e.g., the SDF MLP 206) may be initialized to ensure an approximately spherical SDF in the early part of training. Additionally, β may vary spatially in the volume, which allows for regularizing its values later on.

Then, using expression (1), s and β may be transformed into opacity σ. The radiance may then be predicted with a separate $MLP_c$ (e.g., the radiance MLP 208) conditioned on the geometry features and viewing direction v using expression (5) above. In an embodiment, in contrast to many 3D GANs, the radiance may be conditioned on the viewing direction, allowing a more expressive generation. Thus, given a triplane (e.g., triplane representation 202), any pixel may be rendered by computing σ and c for points along the ray to approximate the volumetric rendering integral as described above. After obtaining σ and c for points along the rays, a tensor of weights and a low resolution image (e.g., 128×128 image) may be determined.

Afterwards, the tensor of weights and the 2D image are provided to an upsampler neural network 212, which may be a convolutional neural network (e.g., a lightweight network) that upsamples the low resolution weights $P_{128}$. The upsampler neural network 212 is described in the following expression:

$$P_{512} = \mathrm{Softmax}(CNN(P_{128}, I_{128})) \quad (6)$$

where CNN is a lightweight network that up-samples the low-resolution weights, Softmax produces discrete distributions along each ray, and the $\hat{P}$ denotes that an estimated tensor of weights.

For instance, based on inputting the tensor of weights and the low resolution 2D image from the uniform sampler 212 into the upsampler neural network 212 and using a Softmax operation, which produces discrete distributions along each camera ray, the upsampler neural network 212 determines (e.g., predicts) an estimated high-resolution distribution of weights $\hat{P}_{512}$, which would include the predicted radiance and opacity for each pixel within an estimated 512×512 image.

In an embodiment, the upsampler neural network 212 may receive information associated with the coarse scene such as the rendering of the low-resolution tensor of weights from the uniform sampler 210. In an embodiment, the information associated with the coarse scene information may further include radiance values (e.g., color), or triplane features in addition to the low-resolution tensor of weights from the uniform sampler 212. The additional information may be provided as input to the upsampler neural network, and may improve the output (e.g., prediction) from the upsampler neural network 212. For instance, the radiance values and/or the triplane feature may encode underlying materials (e.g., fuzzy hair versus solid) skin, which when provided as input to the upsampler neural network 212, may improve the prediction of the surface weight distribution at high-resolution.

In other words, as mentioned above, volumetric rendering of NeRFs at higher resolutions requires extremely large numbers of samples, and thus cost both memory and time. Instead of naive dense sampling at a high resolution, embodiments of the present disclosure may leverage low-resolution renderings (e.g., the tensor of weights and low resolution image from the uniform sampler 210) to cheaply probe the 3D representation for the creation of proposal distributions at high-resolution. For instance, given a target camera and triplane T (e.g., triplane representation 202), first, embodiments of the present disclosure may trace 192 coarse samples at low-resolution (e.g., 128×128) to compute a low-resolution RGB image $I_{128} \in \mathbb{R}^{3\times128\times128}$ and a tensor of weights $P_{128} \in \mathbb{R}^{192\times128\times128}$, which is described above. Each 192-dimensional vector corresponds to a piecewise constant PDF with CDF Φ as shown in expression (3). Then, conditioned on the low-resolution probe, a tensor of proposal volume rendering weights at the high-resolution (e.g., 512×512) may be predicted using expression (6) and the upsampler neural network 212. In some examples, allocating 192 samples at 128×128 may be equivalent to allocating just 12 samples at 512×512.

After the upsampler neural network 212 generates the high-resolution distribution of weights using expression (6) (e.g., $\hat{P}_{512}$), the high-resolution distribution of weights is provided to the adaptive sampler 214, and the adaptive sampler 214 performs adaptive sampling using the volume renderer 204. For instance, using the high-resolution distribution of weights, the adaptive sampler 214 determines additional coordinate points from the triplane representation 202 to further sample. In other words, instead of sampling from a uniform distribution (e.g., 192 uniform sampling points along the ray), the adaptive sampler 214 uses the high-resolution distribution of weights to determine sampling points that are closer to the surface of area of interest (e.g., a person's face). Then, the adaptive sampler 214 uses the volume renderer 204 to sample the triplane representation 202 from these determined sampling points to obtain radiance and opacity values, and uses the radiance and opacity values as well as volume rendering to generate the high-resolution image (e.g., a 512×512 image). Afterwards, the adaptive sampler 214 provides the generated high-resolution image to the discriminator 110 to provide a discriminator output. As mentioned above, in some embodiments, the discriminator 110 may be a GAN discriminator. In some examples, the discriminator 110 may be a CNN, and the CNN may be used in a non-GAN setting.

In some examples, the adaptive sampler 214 may determine the smallest set of bins whose probability exceeds a threshold (e.g., τ=0.98), and may obtain further samples from the triplane representation 202 based on the identified bins form the smallest set of bins. For instance, as mentioned previously, each vector from the high-resolution distribution of weights $\hat{P}_{512}$ (e.g., each vector of length 192 that is associated with a pixel from the 512×512 image) may be a predicted PDF. For each vector (e.g., discrete predicted PDF), the adaptive sampler 214 may compute the smallest number of bins that when their values are summed up, the summation is greater than the threshold τ. For instance, each sample from the vector would constitute a bin and is associated with a probability value (e.g., a probability value that is based on the estimated opacity). The adaptive sampler 214 determines a smallest number of bins that their summation is greater than the threshold. Using the identified bins, the adaptive sampler 214 performs adaptive sampling using the volume renderer 204. For instance, the output from the upsampler neural network 212 may include errors, such as errors regarding the magnitude of the predicted PDFs. Thus, if relying on the magnitudes to perform naïve sampling, aspects (e.g., an entire peak) may be missed. Therefore, instead of relying on the upsampler neural network 212 to predict the correct magnitude, the adaptive sampler 214 may identify a "set" of bins that may contribute to the threshold based on the prediction from the upsampler neural network 212, and the adaptive sampler 214 may sample uniformly from the identified set.

In other words, in an embodiment, the proposals from the upsampler neural network 212 (e.g., $\hat{P}_{512}$) may often be slightly off. In order to utilize the information from the upsampler neural network 212, embodiments of the present disclosure may filter predicted PDFs for better estimation. Specifically, for each discrete predicted PDF $\hat{p}$, embodiments of the present disclosure may compute the smallest set of bins whose probability exceeds a threshold τ=0.98: Embodiments of the present disclosure may find the smallest subset $I \subset \{1, 2, \ldots, 192\}$ such that $$\sum_{i \in I} \hat{p}_i \geq \tau. \tag{7}$$

This operation resembles nucleus sampling in natural language processing (NLP). Embodiments of the present disclosure may define the sampling of PDF q with probability $$q_i = \frac{1}{|I|}$$

if $i \in I$ and 0 otherwise.

For each PDF q, embodiments of the present disclosure may compute its CDF Φ and perform stratified inverse transform sampling to create the samples (e.g., adaptive sampling near the surface). In some embodiments, on top of the twelve samples from the coarse probe (for the high-resolution image), embodiments of the present disclosure may take an additional eighteen samples per pixel adaptively based on the variance of the predicted distributions.

Referring back to FIG. 2A, the training pipeline for training the generator 106, the discriminator 110, and the high resolution neural volume renderer 108 is described below. As mentioned previously, the generator 106 and the discriminator 110 may be a GAN generator/discriminator and/or the generator 106 may be associated with VAEs, diffusion models, and/or other generative models.

Starting out, the components from the overview 100 may be initialized from scratch and the generator 106 may be attempting to create the 3D scene. As mentioned above, the high resolution neural volume renderer 108 may rely on a coarse 3D information for the uniform pass. Thus, before training the components of the high resolution neural volume renderer 108, the generator 106 has to be capable to generate a rough 3D scene. Therefore, the training pipeline may begin with using a low-resolution (e.g., 64×64 or 128×128) neural rendering for the generator 106 to learn the coarse scene, and then introducing the training/supervision of the high resolution neural volume renderer 108.

After performing the initial training steps and initialization, the high resolution neural volume renderer 108 may be further trained to minimize the below loss function:

$$L = L_{adv} + \lambda_{sampler} L_{sampler} + \lambda_{surface} L_{surface} + \lambda_{dec} L_{dec} \tag{8}$$

where $\lambda_{sampler}$, $\lambda_{surface}$, and $\lambda_{dec}$ are the associated scalar weights associated with the losses for the sampler ($L_{sampler}$), surface ($L_{surface}$), and decision ($L_{dec}$). $L_{adv}$ is the standard GAN loss that is known in the art.

$L_{sampler}$ is the loss associated with the volume renderer 204, the uniform sampler 210, and/or the upsampler neural network 212. For instance, to determine $L_{sampler}$, embodiments of the present disclosure may trace 192 coarse samples at high resolution for a small patch (e.g., 64×64 patch) of the image. For example, from the triplane representation 202, camera rays for a patch of a high resolution (e.g., a patch of size 64×64 from a 512×512 image) may be determined. Subsequently, for each camera ray, the uniform sampler 210 may use the volume renderer 204 (e.g., the SDF MLP 206 and the radiance MLP 208) to take a number of samples (e.g., 192 samples) along the camera ray to obtain the radiance and opacity at each of the sample points. Using the radiance and opacity, the ground truth tensor for the patch of the high resolution image (e.g., $P_{patch}$) is determined. This tensor ($P_{patch}$) may be blurred, suppressed, and/or normalized to create a valid disruption using the below equation:

$$\overline{P}_{patch} = \text{Normalize}(\text{Suppress}(\text{Blur}(P_{patch}))) \quad (9)$$

where "Blur" applies a 1D Gaussian kernel to the input distributions (e.g., the ground truth tensor $P_{patch}$, "Suppress" is defined as Suppress(x)=x if x≥5e−3 and 0 otherwise, and "Normalize" is an L1 normalization to create a valid distribution. In some instances, "Suppress" may be similar to a threshold function such that small noises do not contribute to the input distribution. After transforming the tensor $P_{patch}$ using the above to the transformed tensor $\overline{P}_{patch}$, embodiments of the present disclosure may compare the transformed tensor $\overline{P}_{patch}$ with the associated weights for the patch from the estimated high-resolution distribution of weights $\hat{P}_{512}$ (e.g., determine $\hat{P}_{patch}$ from $\hat{P}_{512}$) to determine the loss for the sampler. This is shown in the below expression:

$$L_{sampler} = \text{CrossEntropy}(\overline{P}_{patch}, \hat{P}_{patch}) \quad (10)$$

where CrossEntropy denotes the average cross-entropy between all pairs of pixel-wise discrete distributions.

In other words, from the target camera (e.g., viewpoint of the camera), embodiments of the present disclosure may trace 192 coarse samples at high resolution for a small 64×64 patch, which provides a ground truth tensor of volume rendering weights $P_{patch} \in \mathbb{R}^{192\times64\times64}$. Then, embodiments of the present disclosure may prepare this tensor for supervision by computing $\overline{P}_{patch}$ using expression (9). These operations (e.g., Normalize, Blur, and/or Suppress) may create less noisy distributions to facilitate accurate learning of the high-frequency integrand, which may be undersampled in the coarse pass.

Following, embodiments of the present disclosure may compare the predicted and cleaned ground truth distributions with a cross-entropy loss using expression (10) where $\hat{P}_{patch}$ is the corresponding patch of weights in $\hat{P}_{512}$ and CrossEntropy denotes the average cross-entropy between all pairs of pixelwise discrete distributions. For each pair ($\overline{p}$, $\hat{p}$), embodiments of the present disclosure may compute $\Sigma -\overline{p}_j \log \hat{p}_j$. Given that this supervision may be computed for a small patch, the overhead of sampler training might not be significant.

$L_{surface}$ (e.g., a beta regularization loss) is the loss for regularization for the spatially-varying β values (e.g., the variance of the Laplacian distribution that governs the "tightness" of the representation). For example, as mentioned above, in contrast to EG3D that determines the density and color directly from the triplane representation, the high resolution neural volume renderer 108 determines the β values. Thus, during the adaptive sampling, the adaptive sampler 214 samples the triplane representation 202 to determine the β values (e.g., based on using an SDF MLP 206). During training, using the β values, embodiments of the present disclosure may compare the β values with a target value ($B_{target}$) to determine the surface loss. The surface loss $L_{surface}$ is described by the below expression:

$$L_{surface} = \sum_{hw} (B_{hw} - B_{target})^2 \quad (11)$$

Figure 2C:
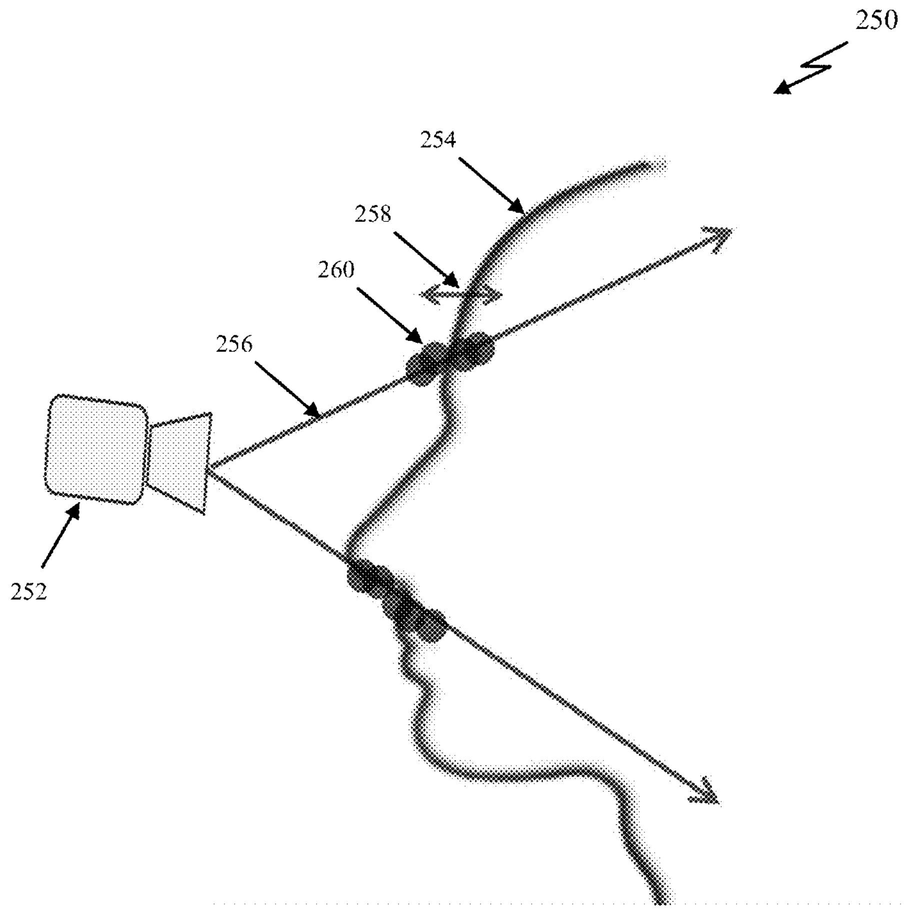
FIG. 2C depicts an illustration showing how the β values impact sample points on a ray, in accordance with one or more embodiments of the present disclosure.

For instance, β may be a parameter used in a Laplace CDF that transforms SDF value to a NeRF density. As such, β in essence defines how tight the surface is (the surface transitions sharply for solid surface like skin versus the surface transitions softly for fuzzy materials like hair). β will be described further in FIG. 2C. FIG. 2C depicts an illustration 250 showing how the β values impact sample points on a ray, in accordance with one or more embodiments of the present disclosure. For instance, given a camera 252 and a surface 254 (e.g., a surface of the triplane representation 202 such as the surface of a person), a ray 256 may be projected outwards from the viewpoint of the camera 252. As mentioned above, the uniform sampler 210 may obtain uniform samples (e.g., samples along the ray at substantially even distances). The adaptive sampler 214 may obtain additional samples (e.g., samples 260) that are closer to the surface 254 of the triplane representation 202. β may be a parameter that governs the tightness of the samples to the surface 254. For instance, the tighter β is, the smaller the double-sided arrow 258 is, which indicates that the additional samples 260 are obtained closer to the surface 254 (e.g., more samples are on the surface 254 or closer to the surface 254).

In conventional approaches, a single global β may be used for everywhere in the scene. In embodiments of the present disclosure, two improvements are described. First, instead of using a single global β, spatially varying beta (e.g., solid surface such as skin versus fuzzy hair) may be used. For example, the MLP SDF 206 may be expanded to predict this spatially varying beta. In the above expression, $B_{hw}$ refers to a β that has the spatial extent height (h) and width (w). Second, in conventional approaches, β was a learnable parameter that may be optimized over the course of the training. But, embodiments of the present disclosure may seek to encourage the surface of the scene to be as tight as possible. The reasons are twofold: (a) the tight surface (small β) produces high fidelity geometry; and (b) the tight surface facilitates the efficient sampling since if the surface is very tight, the high resolution neural volume renderer 108 may "get away" with fewer sampler (versus if the surface is fuzzy, more samples may be used).

In other words, in order to render accurately under low sample budget per ray, embodiments of the present disclosure may desire the surface to be tight (e.g., the set of points along the ray, which contribute to the accumulated radiance, to be small). To accomplish this, embodiments of the present disclosure may introduce a regularization for the spatially-varying β values. Replacing the $c_i$ with the intermediate $\beta_i$ in expression (2) above, embodiments of the present disclosure may volume render an image of scalars, $B \in \mathbb{R}^{512\times512}$, During training, embodiments of the present disclosure may regularize B to be small so that the surface tightens, which is shown in expression (11) where $B_{target}$ is a scalar quantity annealed towards $\epsilon>0$ during optimization. Thus, by regularizing B, this may result in significantly more pronounced and smooth geometry.

During training with the proposal network (e.g., the upsampler neural network 212), the rendering networks may receive gradients for points very near the surface (which have high density). It was found that this may lead to undesirable density growing from the background into the foreground. In order to combat this, embodiments of the present disclosure may leverage the low-resolution information from $I_{128}$, which is computed for uniform samples along the ray, and thus not concentrated at the surface. Considering the SDF values intermediately computed for rendering, $S=S_{128}\vdash\mathbb{R}^{192\times128\times128}$, embodiments of the present disclosure may enforce the SDF decision boundary by minimizing the SDF likelihood under a Laplacian distribution. Thus, embodiments of the present disclosure may determine a decision loss $L_{dec}$ as follows:

$$L_{dec}=\sum\nolimits_{zhw}\exp(-2|S_{zhw}|) \tag{12}$$

$L_{dec}$ may be the loss associated with the SDFs from the uniform sampler 210 (e.g., the SDF values s that are output from the SDF MLP 206). For example, $L_{dec}$ may be a regularization that penalizes off-surface points for creating SDF values close to 0. For instance, "$S_{zhw}$" may be a means to evaluate the SDF values in the volume z (depth), h (height), and w (width), and $S_{zhw}$ may be used to determine the loss $L_{dec}$.

In other words, in an embodiment, in order to begin making use of the learned sampler (e.g., the upsampler neural network 212 and/or the adaptive sampler 214) for high-resolution rendering, a good NeRF representation from which to train the learned sampler may be required. Concurrently, a good sampler may be needed in order to allow NeRF to render at 512×512, the input resolution to the discriminator D 110.

To solve this issue, in the early stages of training, embodiments of the present disclosure may first learn a low-resolution (e.g., 64×64) 3D GAN through the standard NeRF sampling techniques. Embodiments of the present disclosure may bilinearly upsample the low-resolution renderings to 512×512 and blur the real images to the same level, which is described above. After converging at the lower resolution, the sampler training may be introduced (e.g., training of one or more components of the high resolution neural volume renderer 108 may be introduced). Concretely, embodiments of the present disclosure might not only render low-resolution images with standard sampling, but also render sampler inputs $P_{128}$ and supervision patches $P_{patch}$. This results in a good initialization for the sampler.

Having learned an initial low-resolution 3D GAN and high-resolution sampler, embodiments of the present disclosure may transition to rendering with the sampler predictions. The high-resolution proposals $\hat{P}_{512}$ are downsampled to the current rendering resolution, which is progressively increased to the full 512×512 resolution during training. After introducing all losses, the parameters of the generator G 106 may be optimized to minimize the expression (8) above. In some embodiments, the Eikonal constraint might not be enforced. The discriminator D 110 may be trained with R1 gradient regularization whose weight is adapted as the resolution changes. In some embodiments, the generator 106 and discriminator 110 pose conditioning may follow EG3D.

Among other benefits and advantages, embodiments of the present disclosure may provide high resolution neural volume renderer 108 that predicts spatially varying beta (e.g., using the SDF MLP 206), which encodes spatially varying materials. Additionally, and/or alternatively, embodiments of the present disclosure may use beta regularization (e.g., $L_{surface}$) to make the surface as tight as possible. This may ensure the high fidelity 3D geometry and may facilitate more efficient sampling because fewer number of samples may be used during rendering if the surface is tight. Additionally, and/or alternatively, embodiments of the present disclosure may use a robust sampling strategy (e.g., the upsampler neural network 212 and/or the adaptive sampler 214) to make predictions even when the prediction from the upsampler neural network 212 is slightly inaccurate. Additionally, and/or alternatively, embodiments of the present disclosure may use adaptive sampling (e.g., the adaptive sampler 214) to allocate more samples for difficult pixels.

The high resolution neural volume renderer 108, including the implementation and/or training, may be described in further detail in "What You See is What You GAN: Rendering Every Pixel for High-Fidelity Geometry in 3D GANs," arXiv:2401.02411 (2024), which is incorporated herein by reference.

Figure 3:
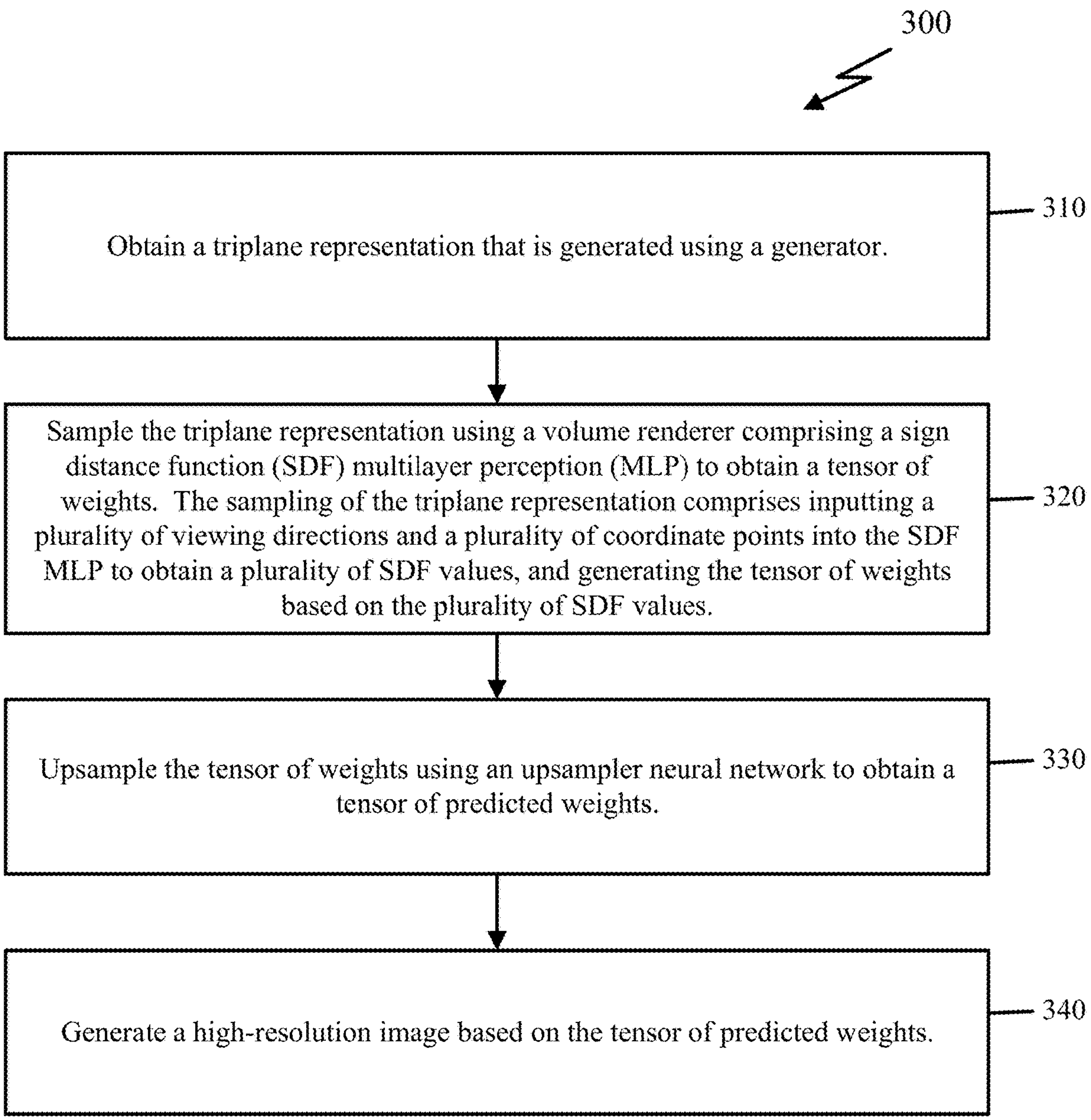
FIG. 3 illustrates a flowchart of a method for using the high resolution neural volume renderer, in accordance with an embodiment.

FIG. 3 illustrates a flowchart of a method 300 for using the high resolution neural volume renderer 108, in accordance with an embodiment. Each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, method 300 is described, by way of example, with respect to the high resolution neural volume renderer 108 of FIGS. 2A and 2B. However, the method 300 may additionally or alternatively be executed by any one system, or any combination of systems, including, but not limited to, those described herein. Furthermore, persons of ordinary skill in the art will understand that any system that performs method 300 is within the scope and spirit of embodiments of the present disclosure.

At 310, a triplane representation that is generated using a generator is obtained. In an embodiment, the generator comprises a first convolutional neural network (CNN) and/or a second CNN. The obtaining the triplane representation that is generated using the generator comprises: inputting a latent vector into a mapping network to generate intermediate latent code; generating initial feature maps based on inputting the intermediate latent code into the first CNN; and generating the triplane representation based on inputting the initial feature maps into the second CNN, wherein the triplane representation comprises refined feature maps for each plane of the triplane representation.

At 320, the triplane representation is sampled using a volume renderer comprising a sign distance function (SDF) multilayer perception (MLP) to obtain a tensor of weights. The sampling of the triplane representation comprises inputting a plurality of viewing directions and a plurality of coordinate points into the SDF MLP to obtain a plurality of SDF values, and generating the tensor of weights based on the plurality of SDF values. In an embodiment, inputting the plurality of viewing directions and the plurality of coordinate points into the SDF MLP to obtain the plurality of SDF values comprises: inputting a first viewing direction and a first coordinate point into the SDF MLP to obtain a first SDF value, a variance of a Laplacian distribution, and geometry features; and determining an opacity at the first coordinate point based on the first SDF value and the variance, and wherein the tensor of weights is based on the opacity at the first coordinate point. In an embodiment, the volume renderer further comprises a radiance MLP and sampling the triplane representation further comprises: inputting the first viewing direction and the geometry features that are output from the SDF MLP into the radiance MLP to obtain a radiance at the first coordinate point, and wherein the tensor of weights is further based on the radiance at the first coordinate point.

At 330, the tensor of weights is upsampled using an upsampler neural network to obtain a tensor of predicted weights. In an embodiment, the tensor of weights indicates a plurality of sample points from the volume renderer, the upsampler neural network is a convolutional neural network (CNN), and the tensor of predicted weights indicates a plurality of estimated sample points that are populated by the CNN.

At 340, a high-resolution image is generated based on the tensor of predicted weights.

In an embodiment, the method 300 may further include training a three-dimensional (3D) generative adversarial network (GAN) using the high-resolution image, wherein the generator comprises a GAN generator, and wherein the 3D GAN comprises the GAN generator and a GAN discriminator. In an embodiment, the method 300 may further include determining a plurality of additional coordinate points from the triplane representation to sample based on the tensor of predicted weights from the upsampler neural network; and based on the volume renderer and the plurality of additional coordinate points, performing adaptive sampling on the triplane representation, and wherein generating the high-resolution image is based on performing the adaptive sampling.

In an embodiment, the tensor of predicted weights comprises a predicted piecewise constant probability density functions (PDF) for each pixel of the high-resolution image, and determining the plurality of additional coordinate points comprises: determining a plurality of probability values for a plurality of bins based on the predicted PDF for each pixel; comparing a set of probability values from the plurality of probability values with a threshold; based on the set of probability values exceeding the threshold, identifying a set of bins from the plurality of bins associated with the set of probability values; and determining the plurality of additional coordinate points based on the set of identified bins.

In an embodiment, the volume renderer further comprises a radiance MLP, and performing the adaptive sampling on the triplane representation comprises: determining a plurality of radiance values based on the additional coordinate points, the SDF MLP, and the radiance MLP, and wherein generating the high-resolution image is based on the plurality of radiance values.

In an embodiment, the method 300 may further include generating a ground truth tensor for a patch of the high-resolution image using the volume renderer; blurring, suppressing, and normalizing the ground truth tensor to generate a transformed ground truth tensor for the patch; computing a sampler loss based on comparing the transformed ground truth tensor for the patch with a training tensor of predicted weights that are generated using the upsampler neural network and the volume renderer; and training the volume renderer and the upsampler neural network using the sampler loss.

In an embodiment, the method 300 may further include obtaining a plurality of training variance values based on inputting a plurality of training viewing directions and a plurality of training coordinate points into the SDF MLP; computing a beta regularization loss based on comparing the plurality of training variance values with a plurality of target variance values; and training the SDF MLP using the beta regularization loss.

In an embodiment, at least one of steps 310-340 and/or the further steps described above for method 300 are performed on a server or in a data center to generate the high-resolution image, and the high-resolution image is streamed to a user device. In an embodiment, at least one of steps 310-340 and/or the further steps described above for method 300 is performed within a cloud computing environment. In an embodiment, at least one of steps 310-340 and/or the further steps described above for method 300 is performed for training, testing, or certifying a neural network employed in a machine, robot, or autonomous vehicle. In an embodiment, at least one of steps 310-340 and/or the further steps described above for method 300 is performed on a virtual machine comprising a portion of a graphics processing unit.

In some examples, embodiments of the present disclosure relate to synthesizing high-resolution 3D geometry and strictly view-consistent images that maintain image quality without relying on post-processing super resolution. For instance, 3D GANs have shown remarkable progress in learning to generate multi-view consistent images and 3D geometries of scenes from collections of 2D images via neural volume rendering. Yet, the significant memory and computational costs of dense sampling in volume rendering have forced 3D GANs to adopt patch-based training or employ low-resolution rendering with post-processing 2D super resolution, which sacrifices multi-view consistency and the quality of resolved geometry. Consequently, 3D GANs have not yet been able to fully resolve the rich 3D geometry present in 2D images. As described herein, embodiments of the present disclosure describe techniques, systems, and/or methods to scale neural volume rendering to the much higher resolution of native 2D images, thereby resolving fine-grained 3D geometry with unprecedented detail. Embodiments of the present disclosure employ learning-based samplers for accelerating neural rendering for 3D GAN training using up to five times fewer depth samples, which enables embodiments of the present disclosure to explicitly "render every pixel" of the full-resolution image during training and inference without post-processing super-resolution in 2D. Together with learning high-quality surface geometry, embodiments of the present disclosure synthesize high-resolution 3D geometry and strictly view—consistent images while maintaining image quality on par with baselines relying on post-processing super resolution.

Parallel Processing Architecture

Figure 4:
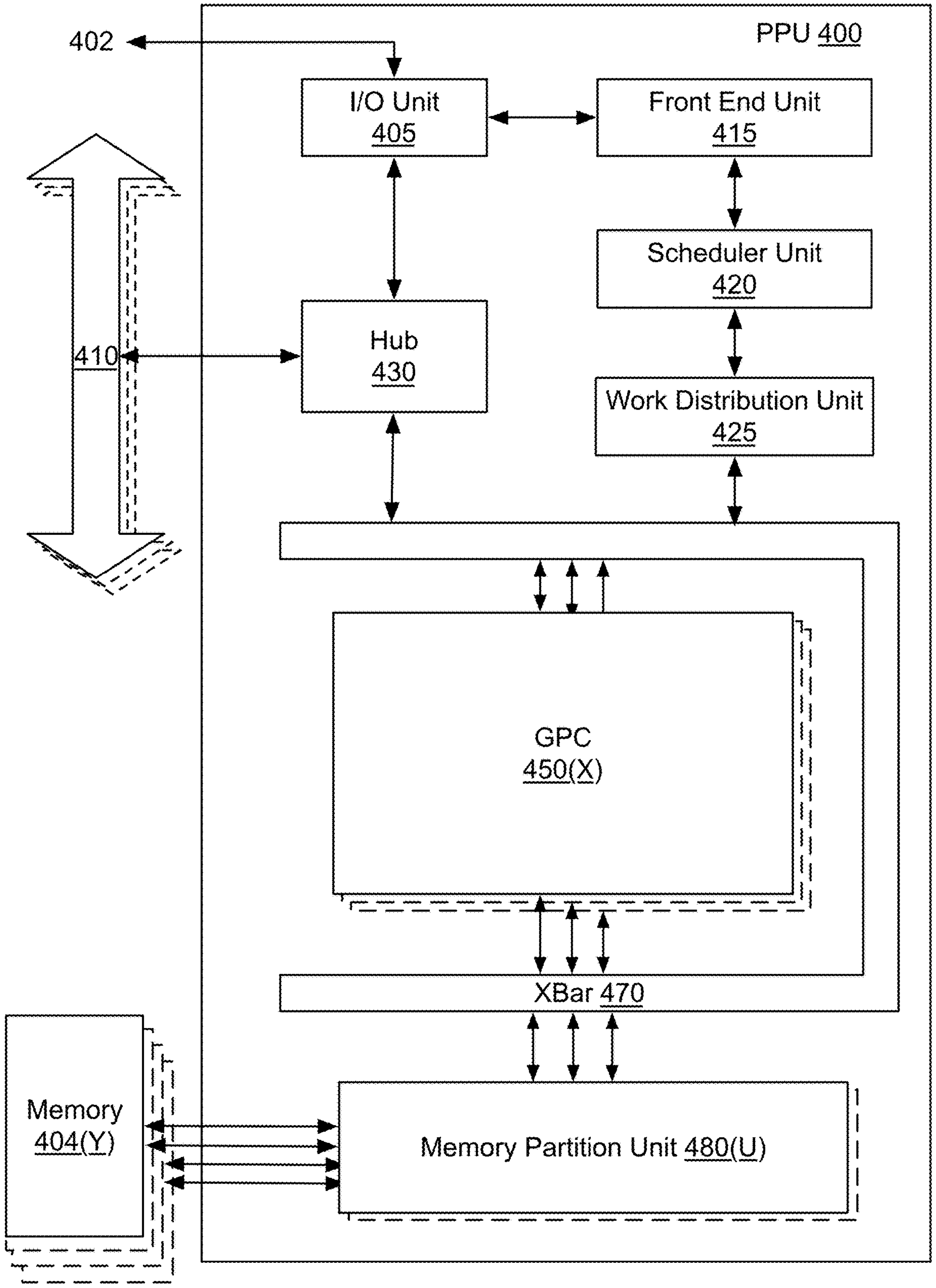
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the sampling technique to scale neural volume rendering to high resolution. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
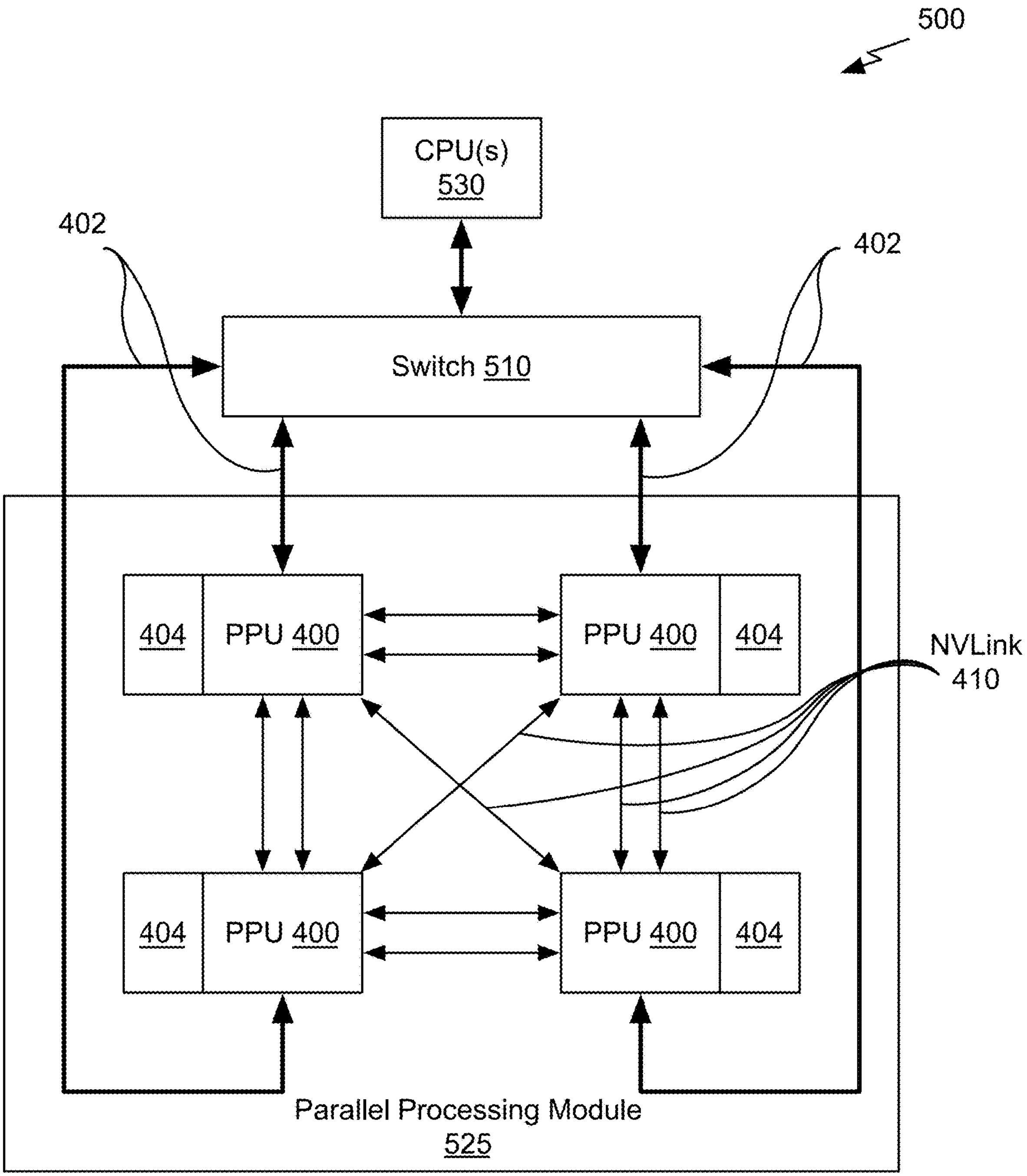
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the sampling technique to scale neural volume rendering to high resolution. The processing system 500 includes a CPU 530, switch 510, and multiple PPUs 400, and respective memories 404.

Figure 5B:
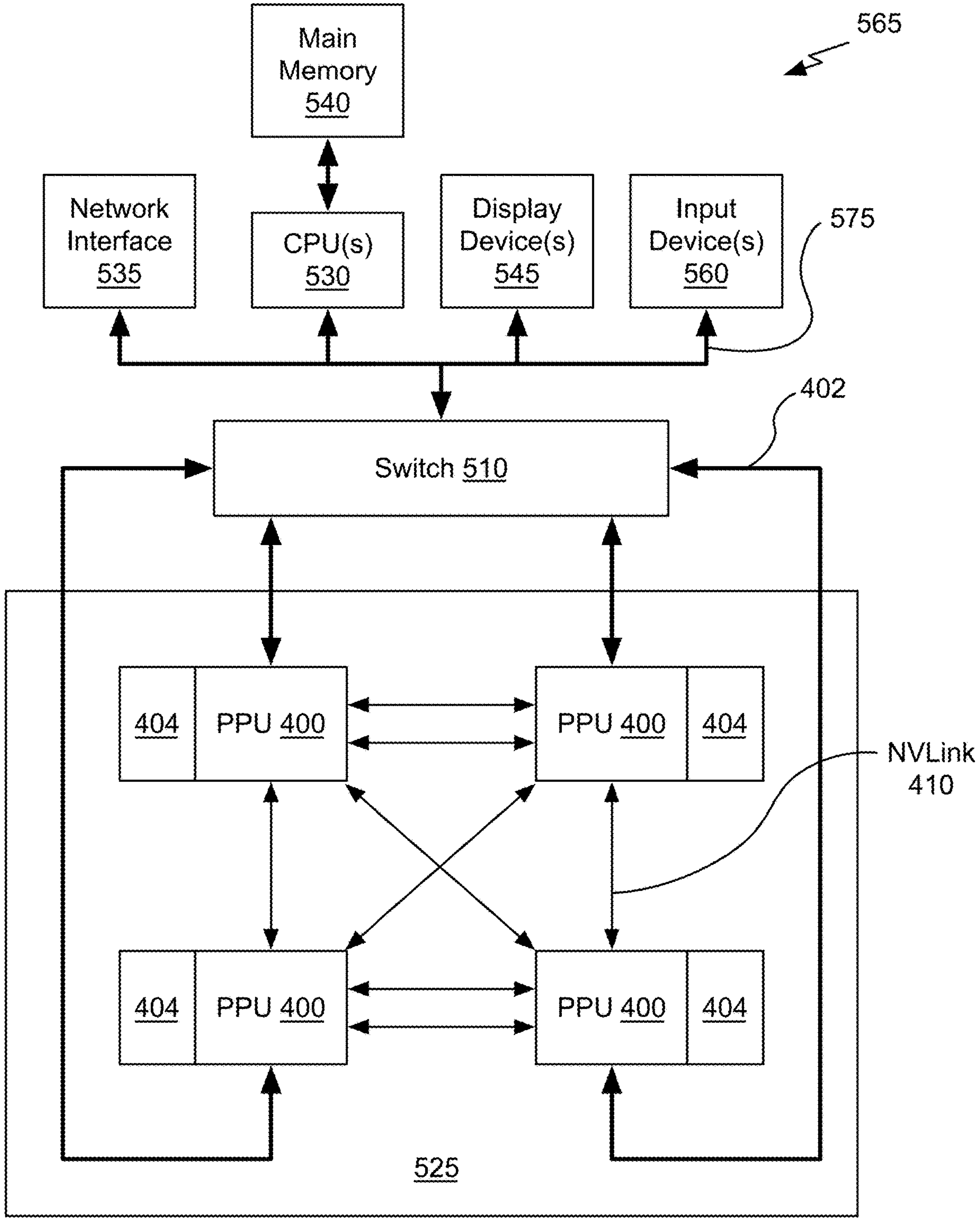
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the sampling technique to scale neural volume rendering to high resolution.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5C:
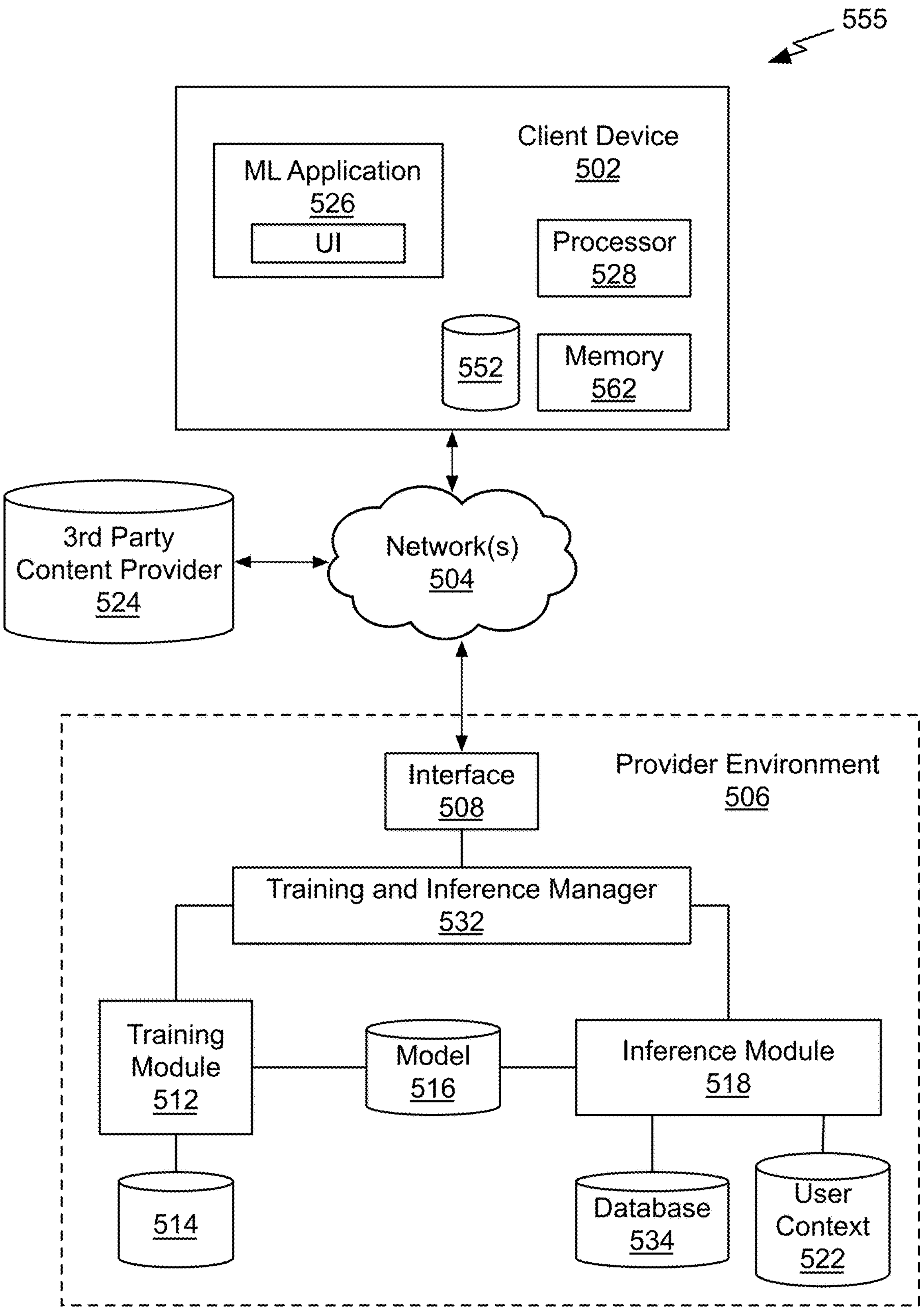
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

A graphics processing pipeline may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline utilizing the hardware of the PPU 400.

Various programs may be executed within the PPU 400 in order to implement the various stages of the graphics processing pipeline. For example, the device driver may launch a kernel on the PPU 400 to perform a vertex shading stage on one processing unit (or multiple processing units). The device driver (or the initial kernel executed by the PPU 400) may also launch other kernels on the PPU 400 to perform other stages of the graphics processing pipeline, such as a geometry shading stage and a fragment shading stage. In addition, some of the stages of the graphics processing pipeline may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6:
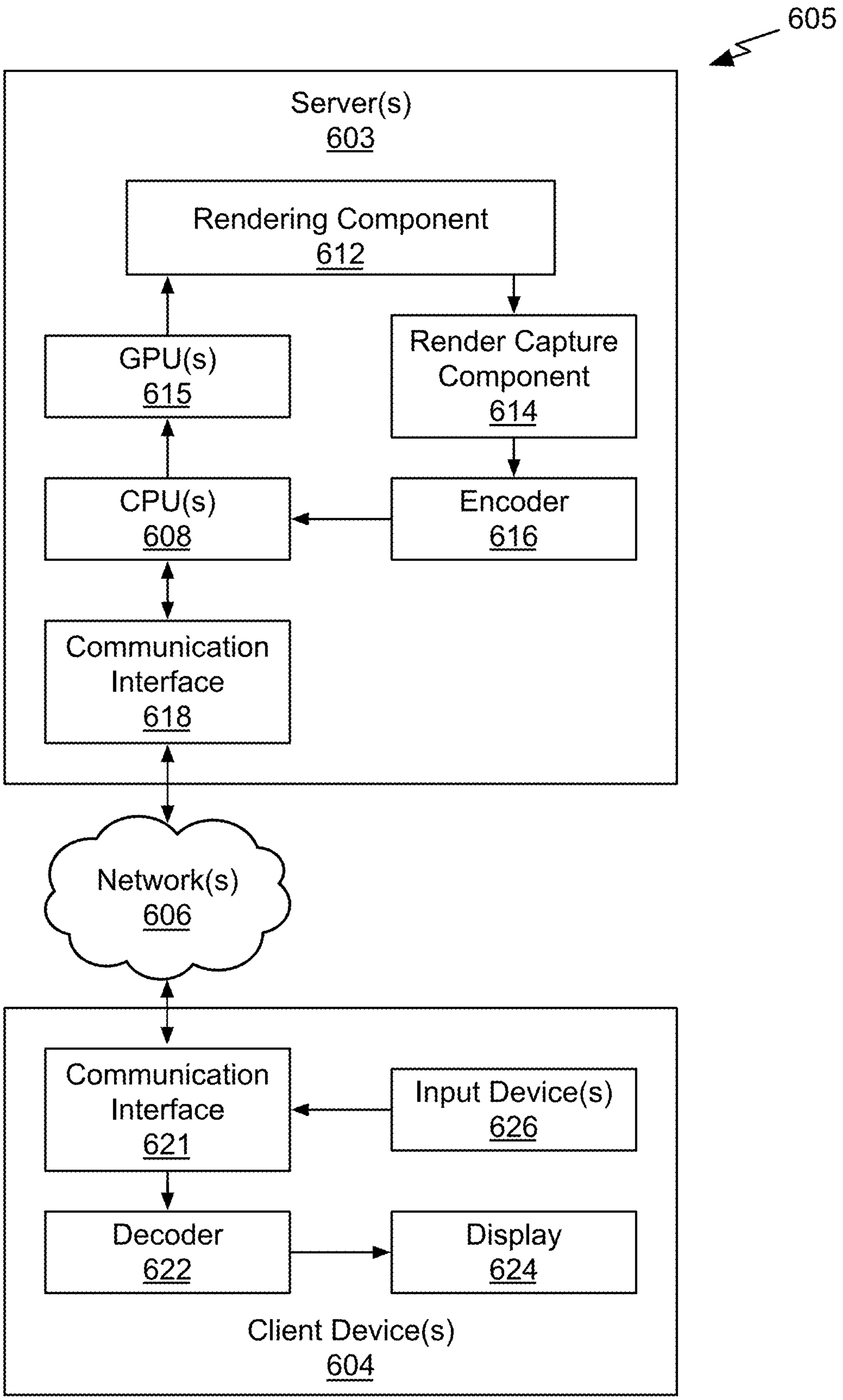
FIG. 6 illustrates an exemplary streaming system suitable for use in implementing some embodiments of the present disclosure.

FIG. 6 is an example system diagram for a streaming system 605, in accordance with some embodiments of the present disclosure. In an embodiment, the streaming system 605 may be a streaming gaming system. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:

obtaining a triplane representation that is generated using a generator;

sampling the triplane representation using a volume renderer comprising a sign distance function (SDF) multilayer perception (MLP) to obtain a tensor of weights, wherein sampling the triplane representation comprises:

inputting a plurality of viewing directions and a plurality of coordinate points into the SDF MLP to obtain a plurality of SDF values; and generating the tensor of weights based on the plurality of SDF values;

upsampling the tensor of weights using an upsampler neural network to obtain a tensor of predicted weights; and generating a high-resolution image based on the tensor of predicted weights.

2. The computer-implemented method of claim 1, further comprising:

training a three-dimensional (3D) generative adversarial network (GAN) using the high-resolution image, wherein the generator comprises a GAN generator, and wherein the 3D GAN comprises the GAN generator and a GAN discriminator.

3. The computer-implemented method of claim 1, wherein the generator comprises a first convolutional neural network (CNN) and/or a second CNN, and wherein obtaining the triplane representation that is generated using the generator comprises:

inputting a latent vector into a mapping network to generate intermediate latent code;

generating initial feature maps based on inputting the intermediate latent code into the first CNN; and generating the triplane representation based on inputting the initial feature maps into the second CNN, wherein the triplane representation comprises refined feature maps for each plane of the triplane representation.

4. The computer-implemented method of claim 1, wherein inputting the plurality of viewing directions and the plurality of coordinate points into the SDF MLP to obtain the plurality of SDF values comprises:

inputting a first viewing direction and a first coordinate point into the SDF MLP to obtain a first SDF value, a variance of a Laplacian distribution, and geometry features; and determining an opacity at the first coordinate point based on the first SDF value and the variance, and wherein the tensor of weights is based on the opacity at the first coordinate point.

5. The computer-implemented method of claim 4, wherein the volume renderer further comprises a radiance MLP, and wherein sampling the triplane representation further comprises:

inputting the first viewing direction and the geometry features that are output from the SDF MLP into the radiance MLP to obtain a radiance at the first coordinate point, and wherein the tensor of weights is further based on the radiance at the first coordinate point.

6. The computer-implemented method of claim 1, wherein the tensor of weights indicates a plurality of sample points from the volume renderer, wherein the upsampler neural network is a convolutional neural network (CNN), and wherein the tensor of predicted weights indicates a plurality of estimated sample points that are populated by the CNN.

7. The computer-implemented method of claim 1, further comprising:

determining a plurality of additional coordinate points from the triplane representation to sample based on the tensor of predicted weights from the upsampler neural network; and based on the volume renderer and the plurality of additional coordinate points, performing adaptive sampling on the triplane representation, and wherein generating the high-resolution image is based on performing the adaptive sampling.

8. The computer-implemented method of claim 7, wherein the tensor of predicted weights comprises a predicted piecewise constant probability density functions (PDF) for each pixel of the high-resolution image, and wherein determining the plurality of additional coordinate points comprises:

determining a plurality of probability values for a plurality of bins based on the predicted PDF for each pixel;

comparing a set of probability values from the plurality of probability values with a threshold;

based on the set of probability values exceeding the threshold, identifying a set of bins from the plurality of bins associated with the set of probability values; and determining the plurality of additional coordinate points based on the set of identified bins.

9. The computer-implemented method of claim 7, wherein the volume renderer further comprises a radiance MLP, and wherein performing the adaptive sampling on the triplane representation comprises:

determining a plurality of radiance values based on the additional coordinate points, the SDF MLP, and the radiance MLP, and wherein generating the high-resolution image is based on the plurality of radiance values.

10. The computer-implemented method of claim 1, further comprising:

generating a ground truth tensor for a patch of the high-resolution image using the volume renderer;

blurring, suppressing, and normalizing the ground truth tensor to generate a transformed ground truth tensor for the patch;

computing a sampler loss based on comparing the transformed ground truth tensor for the patch with a training tensor of predicted weights that are generated using the upsampler neural network and the volume renderer; and training the volume renderer and the upsampler neural network using the sampler loss.

11. The computer-implemented method of claim 1, further comprising:

obtaining a plurality of training variance values based on inputting a plurality of training viewing directions and a plurality of training coordinate points into the SDF MLP;

computing a beta regularization loss based on comparing the plurality of training variance values with a plurality of target variance values; and training the SDF MLP using the beta regularization loss.

12. The computer-implemented method of claim 1, wherein at least one of the steps of obtaining, sampling, upsampling, and generating are performed on a server or in a data center to generate the high-resolution image, and the high-resolution image is streamed to a user device.

13. The computer-implemented method of claim 1, wherein at least one of the steps of obtaining, sampling, upsampling, and generating are performed within a cloud computing environment.

14. The computer-implemented method of claim 1, wherein at least one of the steps of obtaining, sampling, upsampling, and generating are performed for training, testing, or certifying a neural network employed in a machine, robot, or autonomous vehicle.

15. The computer-implemented method of claim 1, wherein at least one of the steps of obtaining, sampling, upsampling, and generating is performed on a virtual machine comprising a portion of a graphics processing unit.

16. A system, comprising:

one or more processors; and a non-transitory computer-readable medium having processor-executable instructions stored thereon, wherein the processor-executable instructions, when executed by the one or more processors, facilitate:

obtaining a triplane representation that is generated using a generator;

sampling the triplane representation using a volume renderer comprising a sign distance function (SDF) multilayer perception (MLP) to obtain a tensor of weights, wherein sampling the triplane representation comprises:

inputting a plurality of viewing directions and a plurality of coordinate points into the SDF MLP to obtain a plurality of SDF values; and generating the tensor of weights based on the plurality of SDF values;

upsampling the tensor of weights using an upsampler neural network to obtain a tensor of predicted weights; and generating a high-resolution image based on the tensor of predicted weights.

17. The system of claim 16, wherein the processor-executable instructions, when executed by the one or more processors, further facilitate:

training a three-dimensional (3D) generative adversarial network (GAN) using the high-resolution image, wherein the generator comprises a GAN generator, and wherein the 3D GAN comprises the GAN generator and a GAN discriminator.

18. The system of claim 16, wherein the generator comprises a first convolutional neural network (CNN) and/or a second CNN, and wherein obtaining the triplane representation that is generated using the generator comprises:

inputting a latent vector into a mapping network to generate intermediate latent code;

generating initial feature maps based on inputting the intermediate latent code into the first CNN; and generating the triplane representation based on inputting the initial feature maps into the second CNN, wherein the triplane representation comprises refined feature maps for each plane of the triplane representation.

19. A non-transitory computer-readable medium having processor-executable instructions stored thereon, wherein the processor-executable instructions, when executed, facilitate:

obtaining a triplane representation that is generated using a generator;

sampling the triplane representation using a volume renderer comprising a sign distance function (SDF) multilayer perception (MLP) to obtain a tensor of weights, wherein sampling the triplane representation comprises:

inputting a plurality of viewing directions and a plurality of coordinate points into the SDF MLP to obtain a plurality of SDF values; and generating the tensor of weights based on the plurality of SDF values;

upsampling the tensor of weights using an upsampler neural network to obtain a tensor of predicted weights; and generating a high-resolution image based on the tensor of predicted weights.

20. The non-transitory computer-readable medium of claim 19, wherein the processor-executable instructions, when executed, further facilitate:

training a three-dimensional (3D) generative adversarial network (GAN) using the high-resolution image, wherein the generator comprises a GAN generator, and wherein the 3D GAN comprises the GAN generator and a GAN discriminator.

* * * * *